(12) United States Patent
Nonaka

(10) Patent No.: US 12,065,085 B2
(45) Date of Patent: Aug. 20, 2024

(54) HARNESS COMPONENT

(71) Applicant: SUMITOMO WIRING SYSTEMS, LTD., Mie (JP)

(72) Inventor: Ippei Nonaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 118 days.

(21) Appl. No.: 17/794,354

(22) PCT Filed: Jan. 7, 2021

(86) PCT No.: PCT/JP2021/000353
§ 371 (c)(1),
(2) Date: Jul. 21, 2022

(87) PCT Pub. No.: WO2021/153186
PCT Pub. Date: Aug. 5, 2021

(65) Prior Publication Data
US 2023/0065391 A1 Mar. 2, 2023

(30) Foreign Application Priority Data
Jan. 28, 2020 (JP) ................. 2020-011725

(51) Int. Cl.
*B60R 16/02* (2006.01)
*B65D 63/14* (2006.01)
(Continued)

(52) U.S. Cl.
CPC .......... *B60R 16/0207* (2013.01); *B65D 63/14* (2013.01); *F16B 2/08* (2013.01); *H02G 3/16* (2013.01); *H02G 3/30* (2013.01)

(58) Field of Classification Search
CPC .. H02G 3/04; H02G 3/16; H02G 3/30; H02G 3/32; B60R 16/0215; B60R 16/0238; B60R 16/0239; F16B 2/08; H01B 7/40
See application file for complete search history.

(56) References Cited

U.S. PATENT DOCUMENTS 3,936,129 A * 2/1976 Guy ..................... H01R 13/516
439/468
4,035,051 A * 7/1977 Guy ..................... H01R 13/516
439/468
(Continued)

FOREIGN PATENT DOCUMENTS

| JP | H08-275345 A | 10/1996 |
|----|--------------|---------|
| JP | 2014-158313 A | 8/2014 |

(Continued)

OTHER PUBLICATIONS

International Search Report issued on Mar. 23, 2021 for WO 2021/153186 A1 (4 pages).

*Primary Examiner* — Paresh Paghadal
(74) *Attorney, Agent, or Firm* — Venjuris, P.C.

(57) ABSTRACT

A harness component according to one aspect of the present disclosure is an electrical connection box, and a harness fixing piece included in a housing of the electrical connection box includes a first wall portion that extends in a length direction of a wire harness, the wire harness being arranged on an inner surface of the first wall portion; a second wall portion that is arranged outside of a lower end, which is an end portion of the first wall portion in a length direction of the wire harness, and is continuous along a lower end; and a bottom portion that extends outward from the lower end of the first wall portion and supports the second wall portion away from the outer surface of the first wall portion.

5 Claims, 8 Drawing Sheets

(51) Int. Cl.
*F16B 2/08* (2006.01)
*H02G 3/16* (2006.01)
*H02G 3/30* (2006.01)

(56) References Cited

U.S. PATENT DOCUMENTS

| | | | |
|---|---|---|---|
| 10,439,381 B1 * | 10/2019 | Mohlman | H02G 3/32 |
| 2017/0085067 A1 * | 3/2017 | Sugimoto | H01R 13/5812 |
| 2019/0140431 A1 * | 5/2019 | Namiki | H01B 17/58 |
| 2019/0371495 A1 * | 12/2019 | Suzuki | B60R 16/0215 |

FOREIGN PATENT DOCUMENTS

| | | | | |
|---|---|---|---|---|
| JP | 2016054588 A | * | 4/2016 | H02G 3/30 |
| JP | 2017-201864 A | | 11/2017 | |

* cited by examiner

HARNESS COMPONENT

CROSS REFERENCE TO RELATED APPLICATIONS

This application is a national phase of PCT application No. PCT/JP2021/000353, filed on 7 Jan. 2021, which claims priority from Japanese patent application No. 2020-011725, filed on 28 Jan. 2020, all of which are incorporated herein by reference.

TECHNICAL FIELD

The present disclosure relates to a harness component.

BACKGROUND

Patent Document 1 describes a cable tie fixing structure in which a plurality of electric wires arranged in an automobile or the like are accommodated and held in a protector, and the plurality of electric wires are fixed to the protector with a cable tie. A band-shaped portion of the cable tie is inserted into a band insertion hole provided in a cable tie holding portion of the protector. The leading end of the band-shaped portion that has passed through the band insertion hole is engaged with a head portion of the cable tie.

PRIOR ART DOCUMENT

Patent Document

Patent Document 1: JP 2014-158313 A

SUMMARY OF THE INVENTION

Problems to be Solved

Incidentally, in the above-described fixing structure, since the cable tie is locked to the cable tie holding portion only by inserting the band-shaped portion of the binding band into the band insertion hole of the binding band holding portion of the protector, during a task of fixing a plurality of electric wires or the like, the cable tie may tilt or the position of the head portion of the binding band may vary. For this reason, there is room for improvement in fixing the protector and the binding band from the viewpoint of improving the efficiency of the task of collectively fixing a plurality of electric wires.

In view of this, an object of the present invention is to provide a harness component that enables improvement of the efficiency of a fixing task performed with a cable tie.

Means to Solve the Problem

The harness component of this disclosure is A harness component to which a wire harness is to be fixed by a cable tie, in which the cable tie includes a long band-shaped portion and a head portion formed in one piece with the band-shaped portion at a base end portion in a length direction of the band-shaped portion, the harness component includes: a first wall portion that extends in a length direction of the wire harness, the wire harness being arranged on an inner side of the first wall portion; a second wall portion that is arranged outside of an end portion of the first wall portion in the length direction of the wire harness, and is continuous along the end portion; and a bottom portion that extends outward from a lower end of the first wall portion and supports the second wall portion away from an outer surface of the first wall portion, and a guide groove through which the band-shaped portion of the cable tie is to be passed is formed between the first wall portion and the second wall portion.

Effect of the Invention

According to the present disclosure, it is possible to provide a harness component that enables improvement of the efficiency of a fixing task performed with a cable tie.

DETAILED DESCRIPTION TO EXECUTE THE INVENTION

Description of Embodiments of Present Disclosure

Figure 1:
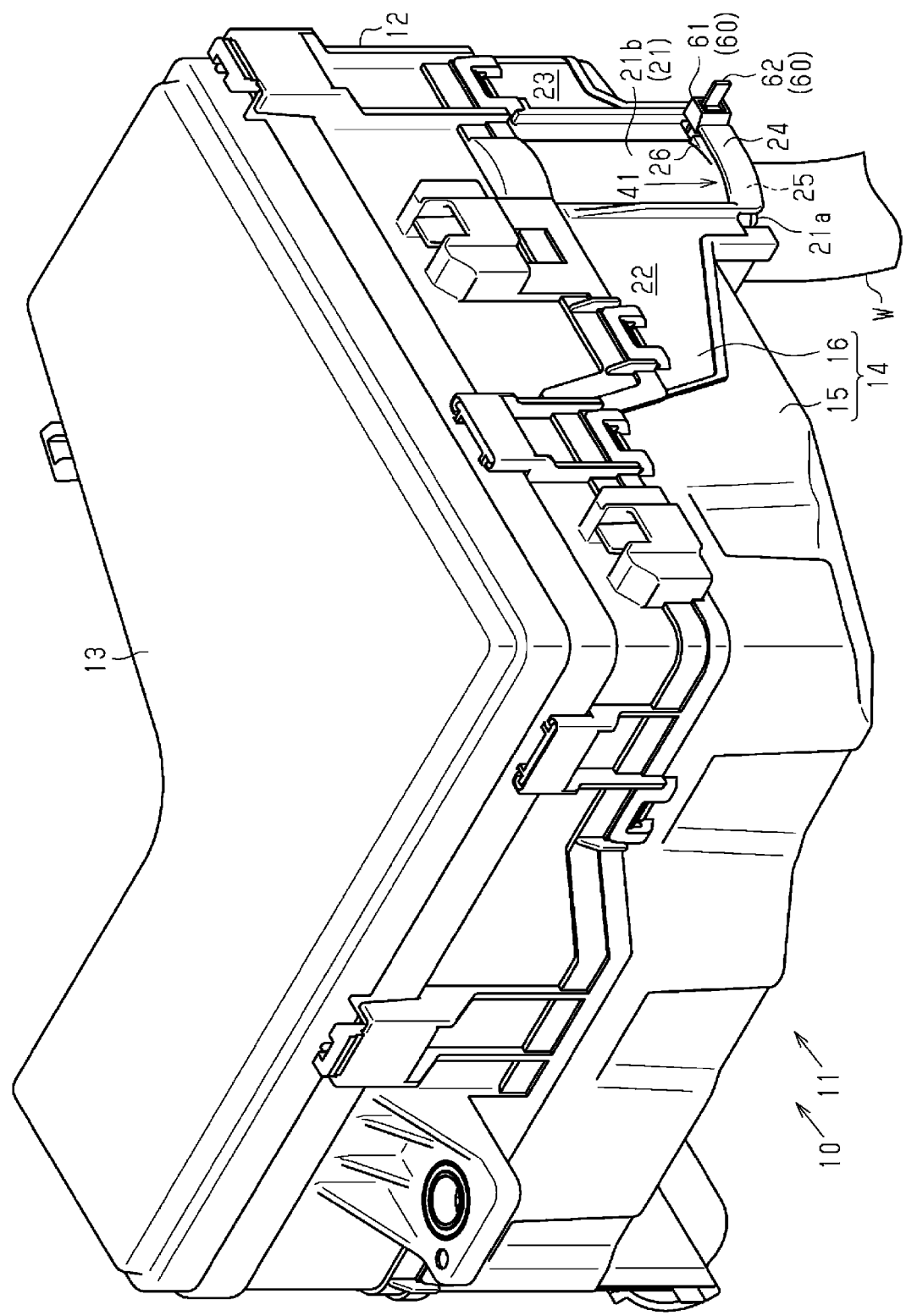
FIG. 1 is a perspective view of an electrical connection box according to an embodiment as viewed from an upper surface side.

First, embodiments of the present disclosure will be listed and described.

[1] The harness component of this disclosure is a harness component to which a wire harness is to be fixed by a cable tie, in which the cable tie includes a long band-shaped portion and a head portion formed in one piece with the band-shaped portion at a base end portion in a length direction of the band-shaped portion, the harness component includes: a first wall portion that extends in a length direction of the wire harness, the wire harness being arranged on an inner side of the first wall portion; a second wall portion that is arranged outside of an end portion of the first wall portion in the length direction of the wire harness, and is continuous along the end portion; and a bottom portion that extends outward from a lower end of the first wall portion and supports the second wall portion away from an outer surface of the first wall portion, and a guide groove through which the band-shaped portion of the cable tie is to be passed is formed between the first wall portion and the second wall portion.

According to the above-described aspect, the leading end of the cable tie can be accommodated in the guide groove by moving the leading end of the cable tie toward the lower end of the first wall portion along the first wall portion. Then, by moving the cable tie along the second wall portion forming the guide groove, the band-shaped portion of the cable tie can be passed through the guide groove, and the cable tie can be attached to the first wall portion. Accordingly, the cable tie can be easily attached to the first wall portion compared to the case where the leading end of the cable tie is inserted into a band insertion opening, and thus the work efficiency is improved.

[2] It is preferable that the head portion of the cable tie abuts on a first end portion in a length direction of the second wall portion.

According to the above-described aspect, the head portion of the cable tie can be easily arranged at a predetermined position.

[3] It is preferable that the head portion of the cable tie is movable in a direction opposite to the second wall portion from the first end portion of the second wall portion.

According to the above-described aspect, the cable tie can be easily arranged by moving the cable tie along the second wall portion toward the guide groove and causing the head portion to abut on the first end portion of the second wall portion.

[4] It is preferable that the first wall portion includes an inner surface and an outer surface, which face mutually opposite directions in a radial direction of the wire harness, and the inner surface and the outer surface are formed in a curved manner so as to bulge outward in the radial direction of the wire harness in a cross-sectional view intersecting the length direction of the wire harness, and the second wall portion includes a linear portion that extends in a tangential direction with respect to the outer surface of the first wall portion, and a curved portion that is continuous with the linear portion and is curved along the outer surface of the first wall portion.

According to the above-described aspect, the curved portion bends the band-shaped portion of the cable tie arranged in the guide groove toward the inner surface of the first wall portion. For this reason, the band-shaped portion can be easily wound around the wire harness arranged on the inner surface side of the first wall portion.

[5] It is preferable that a guide groove forming portion that has a side surface opposing the linear portion is included between the outer surface of the first wall portion and the linear portion of the second wall portion, and the guide groove includes a linear first guide groove that is sandwiched between the side surface of the guide groove forming portion and the linear portion of the second wall portion, and a second guide groove that is sandwiched between the curved portion of the second wall portion and the first wall portion and is curved.

According to the above-described aspect, since the base end portion of the band-shaped portion is sandwiched between the guide groove forming portion and the straight portion of the first wall portion, the movement of the band-shaped portion is restricted, that is, the head portion is fixed at a predetermined position.

[6] It is preferable to include a support portion that extends from the bottom portion to a side opposite to the guide groove forming portion.

According to the above-described aspect, the support portion is located toward the first wall portion with respect to the head portion abutting on the second wall portion. Accordingly, when the head portion tries to move toward the first wall portion, the head portion abuts on the support portion, and thereby the movement of the head portion can be restricted.

[7] It is preferable that the support portion includes a first support portion that extends from the bottom portion and a second support portion that extends upward from a leading end of the first support portion, the head portion of the cable tie includes an insertion hole through which the band-shaped portion is to be inserted, and the second support portion is arranged so as not to overlap with the insertion hole of the head portion abutting on the second wall portion.

According to the above-described aspect, by winding the band-shaped portion of the cable tie around the wire harness and inserting the leading end portion of the band-shaped portion in the second support portion, the leading end portion can be easily inserted into the insertion hole of the head portion.

Detail of Embodiments of Present Disclosure

Specific examples of the harness component of the present disclosure will be described below with reference to the drawings. In each drawing, for convenience of description, some configurations may be exaggerated or simplified. Also, the dimensional proportions of each portion may differ in each drawing. The terms "parallel" and "orthogonal" in the present specification include not only the case of being strictly parallel and orthogonal, but also the case of being substantially parallel and orthogonal within a range in which the actions and effects in the present embodiment are exhibited. Note that the present invention is not limited to these examples, but is indicated by the scope of claims, and is intended to encompass all modifications within the meaning and scope equivalent to the scope of claims.

Figure 2:
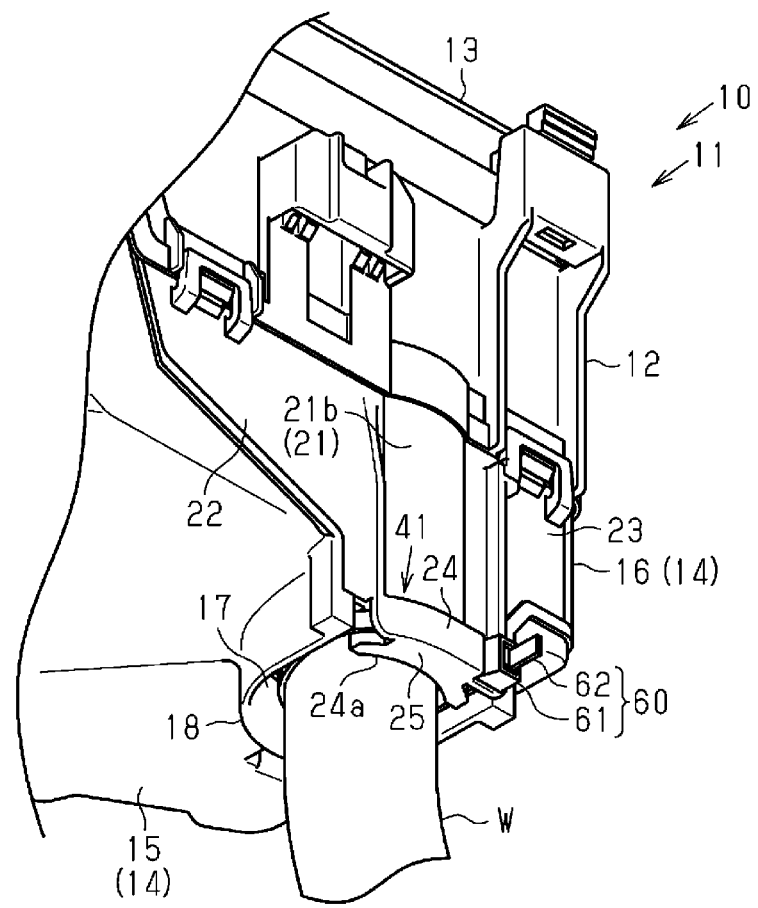
FIG. 2 is a perspective view of the electrical connection box as viewed from a bottom side.

FIGS. 1 and 2 show an electrical connection box 10, which is an example of a harness component. The electrical connection box 10 is configured as, for example, a relay box or a fuse box interposed between a plurality of electrical components mounted in a vehicle and a power source such as a battery.

As shown in FIGS. 1 and 2, the electrical connection box 10 includes a housing 11 that houses electrical components such as relays and fuses.

The housing 11 includes a base 12 to which electrical components are attached, an upper cover 13 attached to the upper portion of the base 12, and a lower cover 14 attached to the lower portion of the base 12. The base 12, the upper cover 13, and the lower cover 14 are made of, for example, a synthetic resin such as polypropylene (PP), and are formed through injection molding or the like.

As shown in FIG. 2, the lower surface of the lower cover 14 has an insertion opening 17 through which a wire harness W is inserted. In the present embodiment, the lower cover 14 includes a cover main body 15 and a harness fixing piece 16. The harness fixing piece 16 is attached to the base 12 together with the lower cover 14. The lower cover 14 has a cover piece 18 that extends from the lower surface. The cover piece 18 is formed in a U shape in a view of the cover body 15 from below. The harness fixing piece 16 is included in the lower cover 14 that covers the lower portion of the base 12 together with the cover main body 15. Also, the harness fixing piece 16 forms a substantially cylindrical electric wire guide portion together with the cover piece 18 of the cover main body 15.

As shown in FIGS. 1 and 2, a cable tie 60 is attached to the harness fixing piece 16. As shown in FIG. 2, the cable tie 60 fixes the wire harness W inserted through the insertion opening 17 to the harness fixing piece 16, that is, to the housing 11. The wire harness W includes, for example, one or a plurality of electric wires. If the wire harness W includes a plurality of electric wires, the number of electric wires varies depending on the vehicle type of the vehicle in which the electric connection box 10 for the wire harness W is mounted, and the like. The plurality of electric wires are bundled by, for example, adhesive tape. Note that the plurality of electric wires need not be bundled by adhesive tape or the like. Also, the wire harness W may include an optical fiber.

The cable tie 60 has a head portion 61 and a band-shaped portion 62. The head portion 61 and the band-shaped portion 62 are formed in one piece. The band-shaped portion 62 is formed in an elongated flat plate shape having a rectangular cross section. That is, the cable tie 60 has a long band-shaped portion 62 and a head portion 61 formed in one piece with the band-shaped portion 62 at the base end portion in the length direction of the band-shaped portion 62. The band-shaped portion 62 has, on one surface in the thickness direction, many sawtooth-shaped protrusions that are formed side by side in the length direction of the band-shaped portion 62. The head portion 61 is formed in a rectangular parallelepiped shape. The cable tie 60 is made of, for example, a synthetic resin such as polypropylene or fluororesin.

Figure 13:
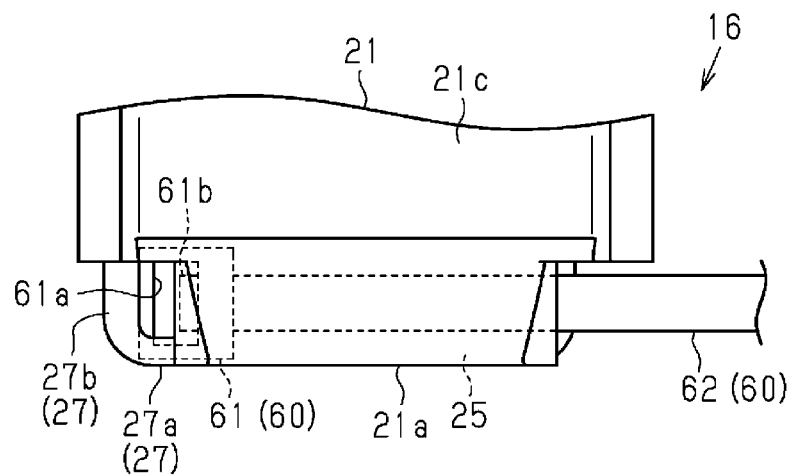
FIG. 13 is an illustrative diagram showing part of the harness fixing piece and the cable tie.
Figure 14:
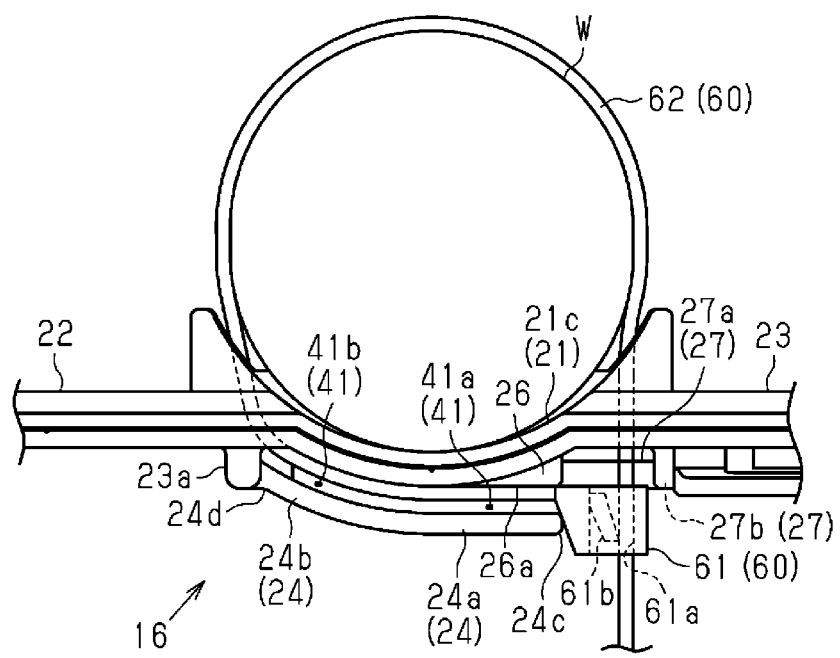
FIG. 14 is an illustrative diagram showing part of the harness fixing piece and the cable tie, to which a wire harness has been fixed.

As shown in FIGS. 13 and 14, the head portion 61 has an insertion hole 61a through which the band-shaped portion 62 is inserted, and a locking piece 61b in the insertion hole 61a. The head portion 61 holds the band-shaped portion 62 in an annular shape through the engagement between the sawtooth-shaped protrusions of the band-shaped portion 62 inserted through the insertion hole 61a and the locking piece 61b. As a result, the cable tie 60 bundles and fixes the wire harness W to the first wall portion 21 of the harness fixing piece 16.

Figure 3:
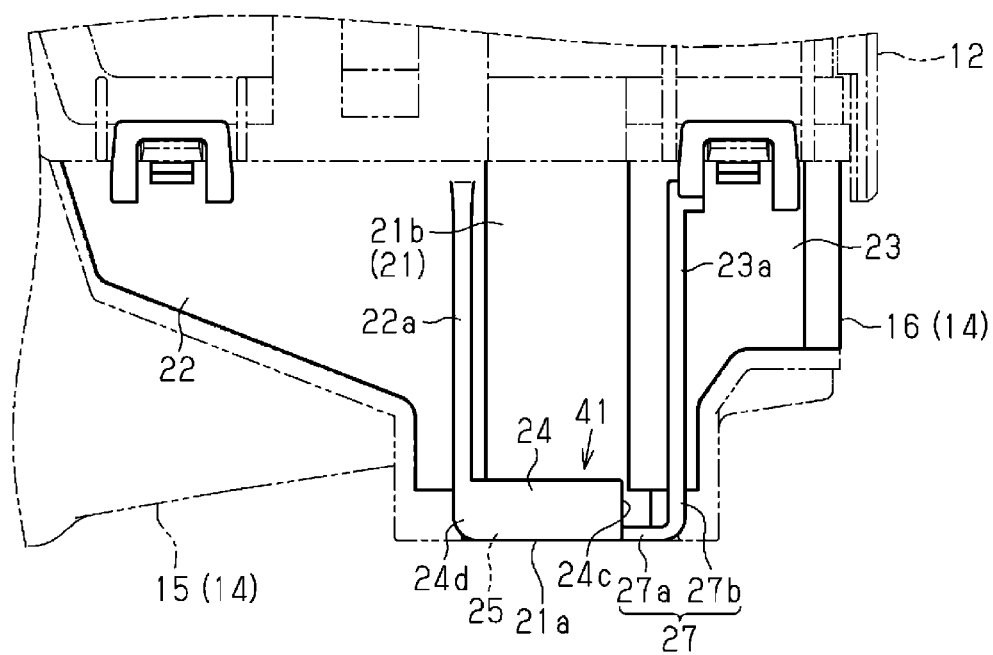
FIG. 3 is a front view showing a harness fixing piece.
Figure 7:
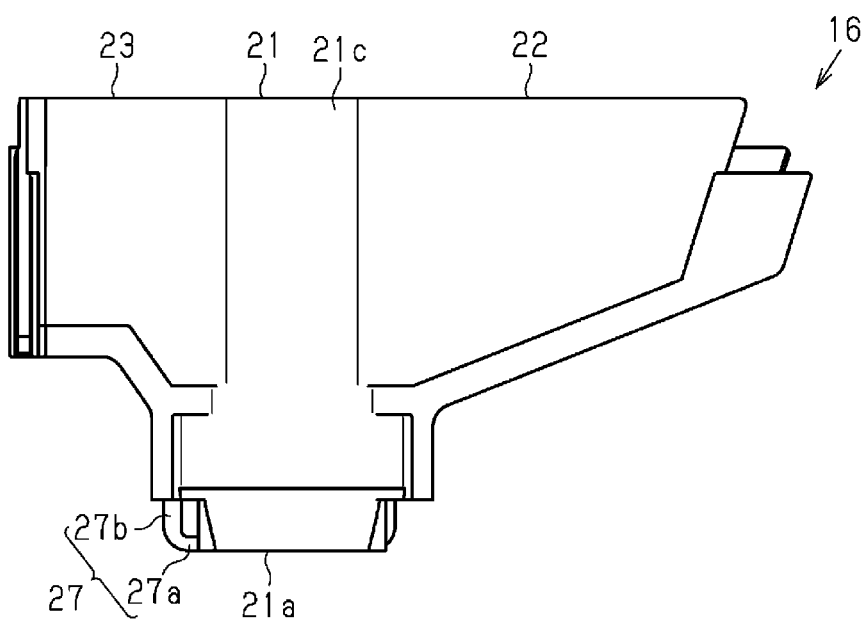
FIG. 7 is a side view of the harness fixing piece as viewed from the inside of the electrical connection box.

As shown in FIGS. 2, 3, and 7, the harness fixing piece 16 has a central first wall portion 21 and fixing portions 22 and 23 on both sides of the first wall portion 21. The harness fixing piece 16 is attached to the base 12 together with the cover main body 15 by the fixing portions 22 and 23.

Figure 6:
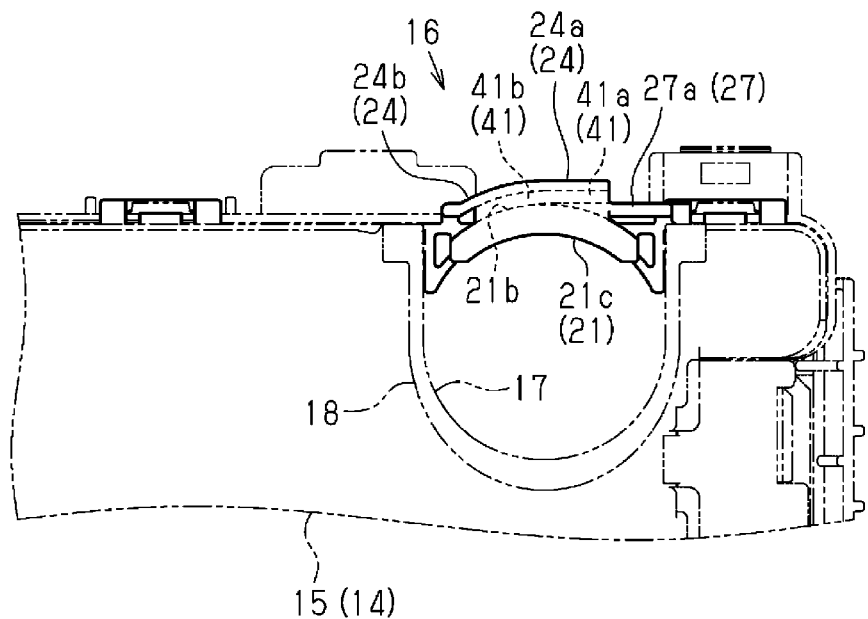
FIG. 6 is a bottom view showing the harness fixing piece.

As shown in FIGS. 2 and 6, the first wall portion 21 may be curved along the peripheral direction of the wire harness W (see FIG. 2) arranged inside the lower cover 14. For example, in a view of the lower cover 14 from below, that is, in a cross-sectional view intersecting the length direction of the wire harness W, the first wall portion 21 may be formed in an arc shape.

Figure 11:
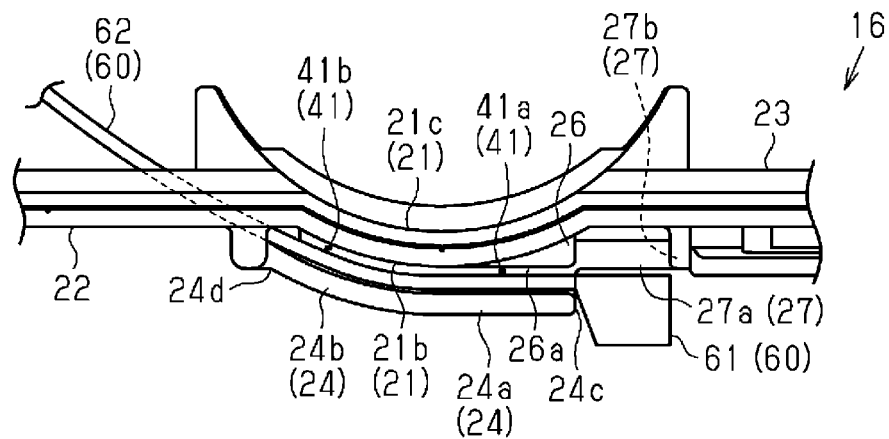
FIG. 11 is an illustrative diagram showing part of the harness fixing piece and the cable tie.

As shown in FIG. 1 and the like, the harness fixing piece 16 has a second wall portion 24 on the outside of the first wall portion 21. As shown in FIGS. 1, 2, 5, and 8, the second wall portion 24 is provided at a lower end 21a, which is an end portion of the first wall portion 21 in the length direction of the wire harness W. The second wall portion 24 is supported away from the outer surface 21b of the first wall portion 21 by a bottom portion 25 extending outward from the lower end 21a of the first wall portion 21. As shown in FIG. 11, the distance between the first wall portion 21 and the second wall portion 24 is set to be greater than the thickness of the band-shaped portion 62 of the cable tie 60 attached to the harness fixing piece 16. The first wall portion 21 and the second wall portion 24 form a guide groove on the outside of the first wall portion 21. That is, the harness fixing piece 16 has a guide groove 41 on the outside of the first wall portion 21. The guide groove 41 extends continuously along the outer surface 21b of the first wall portion 21 at the lower end 21a of the first wall portion 21. The guide groove 41 accommodates the band-shaped portion 62 of the cable tie 60. By inserting the band-shaped portion 62 of the cable tie 60 along the guide groove 41, the cable tie 60 is attached at a predetermined position.

Figure 4:
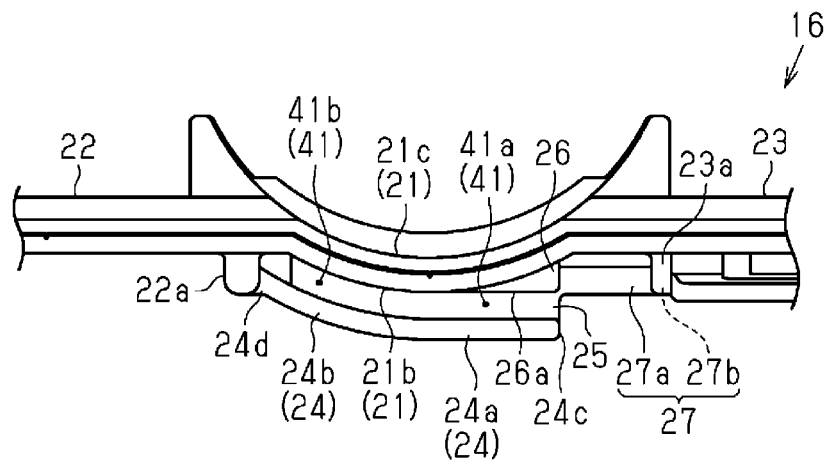
FIG. 4 is a partial top view of the harness fixing piece.

As shown in FIG. 4, the second wall portion 24 has a linear portion 24a extending in a tangential direction of the first wall portion 21 with respect to the arc-shaped first wall portion 21, and a curved portion 24b that is continuous with the straight portion 24a and is curved along the outer surface 21b of the first wall portion 21. A guide groove forming portion 26 is provided between the outer surface 21b of the first wall portion 21 and the linear portion 24a of the second wall portion 24. The guide groove forming portion 26 has a side surface 26a opposing the linear portion 24a of the second wall portion 24. The side surface 26a is planar. The guide groove forming portion 26 makes the guide groove 41 between the guide groove forming portion 26 and the linear portion 24a of the second wall portion 24 linear. That is, the guide groove 41 has a first guide groove 41a extending linearly on the side of the linear portion 24a of the second wall portion 24. Also, the guide groove 41 has a second guide groove 41b that is curved along the outer surface 21b of the first wall portion 21 between the outer surface 21b of the first wall portion 21 and the curved portion 24b of the second wall portion 24.

Figure 8:
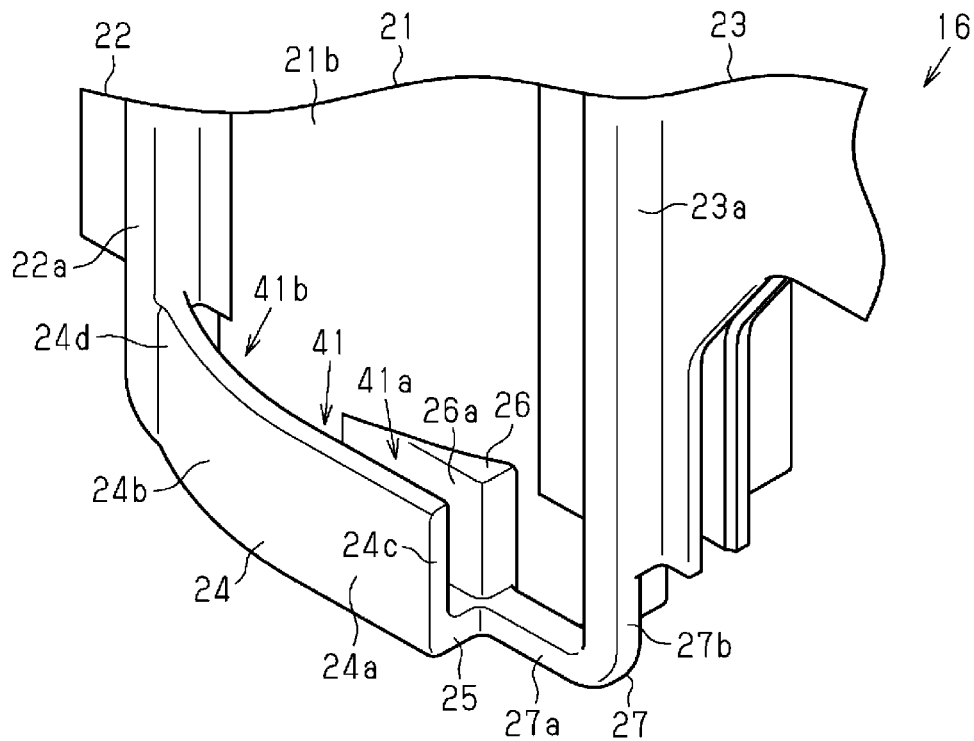
FIG. 8 is a perspective view showing part of the harness fixing piece.

As shown in FIGS. 3, 4, 8, 11, and 13, the harness fixing piece 16 has a support portion 27 extending from the bottom portion 25 in the direction opposite to the guide groove forming portion 26. The support portion 27 has a first support portion 27a extending from the bottom portion 25 and a second support portion 27b extending upward from the leading end of the first support portion 27a. As shown in FIG. 13, the second support portion 27b is arranged so as not to overlap with the insertion hole 61a of the head portion 61 (see FIG. 9) abutting on the second wall portion 24. As shown in FIG. 8, the second support portion 27b is formed so as to be continuous with a rib 23a provided in a standing manner on the outer surface of the fixing portion 23.

Figure 10:
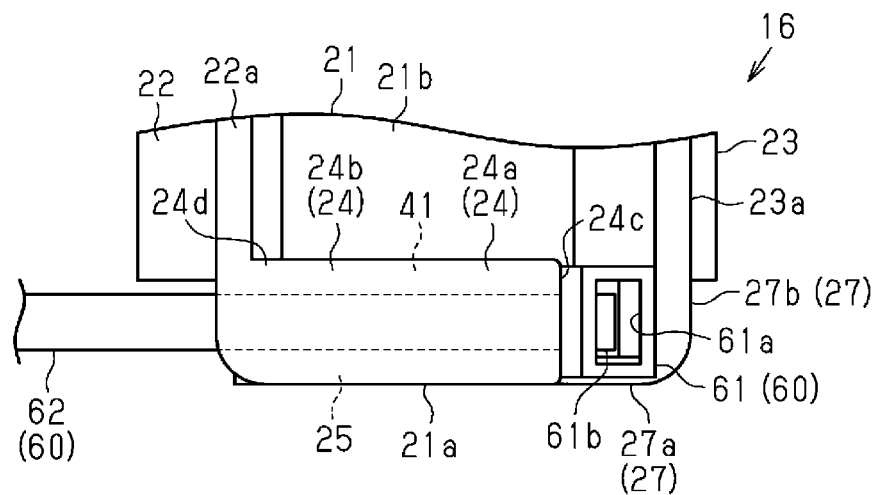
FIG. 10 is an illustrative diagram showing part of the harness fixing piece and the cable tie.

As shown in FIG. 11, the thickness of the head portion 61 of the cable tie 60 is thicker than the thickness of the band-shaped portion 62 in the thickness direction of the band-shaped portion 62. The head portion 61 abuts on a first end portion 24c on the side of the linear portion 24a of the second wall portion 24. Also, as shown in FIG. 10, the width of the head portion 61 is wider than the width of the band-shaped portion 62. Accordingly, the head portion 61 abuts on the bottom portion 25. As a result, the head portion 61 is restricted from moving. That is, the head portion 61 is positioned by the first end portion 24c of the second wall portion 24.

Figure 12:
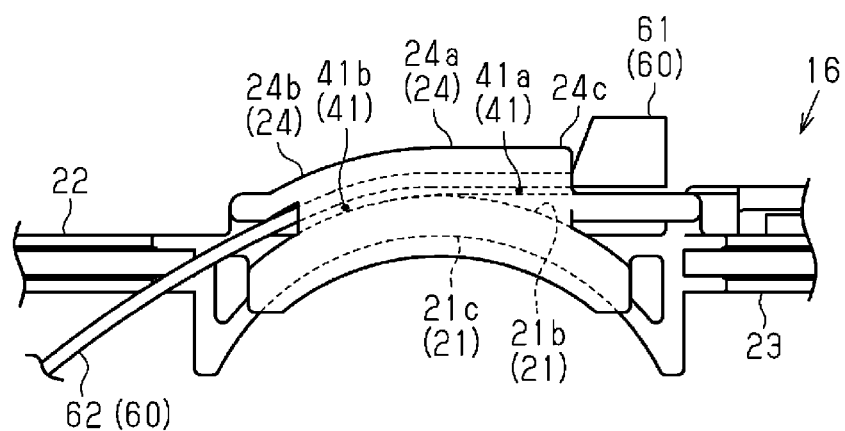
FIG. 12 is an illustrative diagram showing part of the harness fixing piece and the cable tie.

As shown in FIG. 13, the first support portion 27a of the support portion 27 extends from the bottom portion 25. Accordingly, the first support portion 27a overlaps with the head portion 61 of the cable tie 60 in the penetration direction of the insertion hole 61a of the head portion 61. As shown in FIG. 12, the first support portion 27a restricts the movement of the head portion 61 in the direction toward the first wall portion 21.

As shown in FIGS. 3 and 8, a rib 22a that extends parallel to the first wall portion 21 is provided on the outer surface of the fixing portion 22. The lower end of the rib 22a is connected to a second end portion 24d on the side of the curved portion 24b of the second wall 24. That is, the second end portion 24d of the second wall portion 24 is connected to the fixing portion 22 by the rib 22a.

Figure 5:
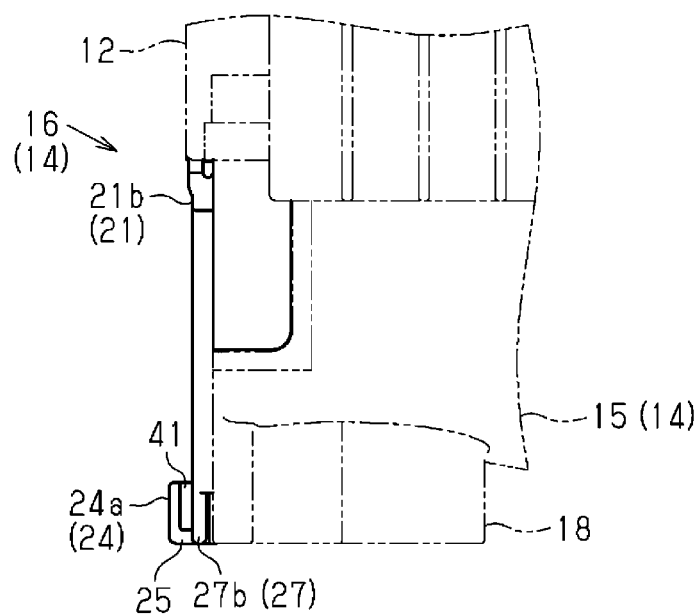
FIG. 5 is a side view showing the harness fixing piece.

As shown in FIG. 5, when the harness fixing piece 16 is viewed from the side of the linear portion 24a of the second wall portion 24, the second wall portion 24 and the guide groove 41 are not blocked by other members. Accordingly, as shown in FIGS. 5 and 11, the head portion 61 of the cable tie 60 abutting on the first end portion 24c of the second wall portion 24 can move in the direction opposite to the second wall portion 24 along the linear portion 24a of the second wall portion 24.

The actions and effects of this embodiment will be described.

(1) The cable tie 60 has a long band-shaped portion 62 and a head portion 61 formed in one piece with the band-shaped portion 62 at the base end portion in the length direction of the band-shaped portion 62.

The harness fixing piece 16 includes a first wall portion 21 that extends in the length direction of the wire harness W and has an inner surface 21c on which the wire harness W is arranged, a second wall portion 24 that is arranged outside of the lower end 21a, which is the end portion of the first wall portion 21 in the length direction of the wire harness W, and that is continuous along the lower end 21a, and a bottom portion 25 that extends outward from the lower end 21a of the first wall portion 21, and supports the second wall portion 24 away from the outer surface 21b of the first wall portion 21. The first wall portion 21 and the second wall portion 24 form a guide groove 41 therebetween, through which the band-shaped portion 62 of the cable tie 60 is passed.

Figure 9:
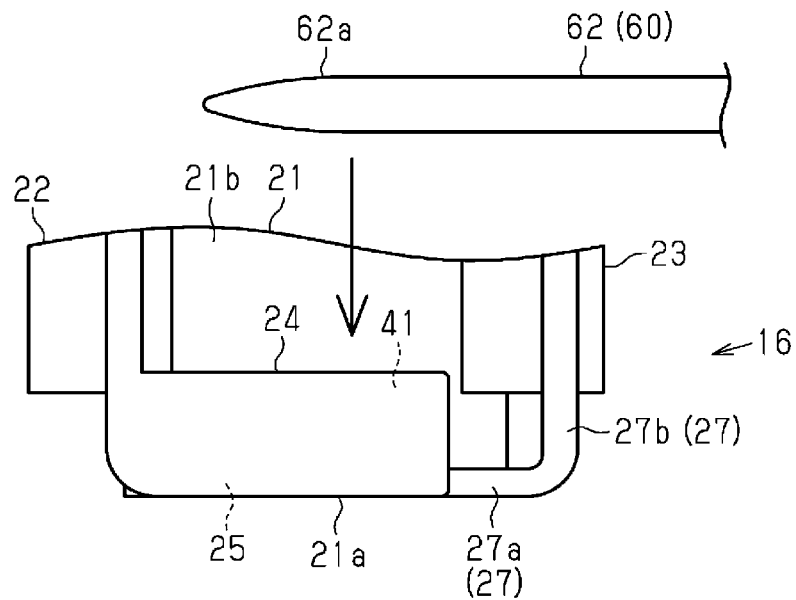
FIG. 9 is an illustrative diagram showing part of the harness fixing piece and a cable tie.

(2) As shown in FIG. 9, by moving the leading end portion 62a of the band-shaped portion 62 of the cable tie 60 along the first wall portion 21 toward the lower end 21a of the first wall portion 21, the leading end portion 62a of the cable tie 60 can be housed in the guide groove 41. Then, by moving the cable tie 60 along the second wall portion 24 forming the guide groove 41, the cable tie 60 can be attached to the first wall portion 21, that is, to the harness fixing piece 16. Accordingly, compared with the case where the leading end portion of the cable tie 60 is inserted into the band insertion hole, the cable tie 60 can be attached to the first wall portion 21 of the harness fixing piece 16, and the work efficiency can be improved.

(3) A rib 22a extending parallel to the first wall portion 21 is provided on the outer surface of the fixing portion 22. The lower end of the rib 22a is connected to the second end portion 24d of the second wall 24. That is, the upper end of the second end portion 24d of the second wall portion 24 is connected to the fixing portion 22 by the rib 22a. Also, the rib 22a engages in the opening direction of the guide groove 41 with the band-shaped portion 62 of the cable tie 60 housed in the guide groove 41 at the second end portion 24d of the second wall portion 24. As a result, the band-shaped portion 62 housed in the guide groove 41 is prevented from coming out of the guide groove 41.

(4) As shown in FIG. 5, when the harness fixing piece 16 is viewed from the side of the linear portion 24a of the second wall portion 24, the second wall portion 24 and the guide groove 41 are not blocked by other members. Accordingly, as shown in FIGS. 11 and 12, the head portion 61 of the cable tie 60 abutting on the first end portion 24c of the second wall portion 24 can move in the opposite direction to the second wall portion 24 along the linear portion 24a of the second wall portion 24. That is, the head portion 61 is not restricted from moving in the direction opposite to the first guide groove 41a. In other words, the cable tie 60 having the band-shaped portion 62 arranged in the guide groove 41 is moved along the first guide groove 41a toward the linear first guide groove 41a. Then, the head portion 61 of the cable tie 60 can abut on the first end portion 24c of the second wall portion 24 forming the guide groove. Accordingly, the head portion 61 of the cable tie 60 can be arranged at a predetermined position of the harness fixing piece 16.

(5) The first wall portion 21 has an outer surface 21b and an inner surface 21c facing mutually opposite sides in the radial direction of the wire harness W, and the outer surface 21b and the inner surface 21c are formed in a curved manner so as to bulge outward in the radial direction of the wire harness W in a cross-sectional view intersecting the length direction of the wire harness W. Accordingly, the wire harness W can be fixed to the harness fixing piece 16 along the inner surface 21c of the first wall portion 21.

(6) The second wall portion 24 has a linear portion 24a extending in a tangential direction with respect to the outer surface 21b of the first wall portion 21 and a curved portion 24b that is continuous with the linear portion 24a and is curved along the outer surface 21b of the first wall portion 21. As shown in FIGS. 11 and 12, the curved portion 24b, which is curved, bends the band-shaped portion 62 of the cable tie 60 arranged in the guide groove 41 toward the inner surface 21c of the first wall portion 21. For this reason, the band-shaped portion 62 can be easily wound around the wire harness W arranged on the inner surface 21c side of the first wall portion 21.

(7) A guide groove forming portion 26 is included between the outer surface 21b of the first wall portion 21 and the linear portion 24a of the second wall portion 24. The guide groove forming portion 26 has a side surface 26a opposing the linear portion 24a. The guide groove 41 includes a linear first guide groove 41a sandwiched between the side surface 26a of the guide groove forming portion 26 and the linear portion 24a of the second wall portion 24, and a second guide groove 41b that is sandwiched between the curved portion 24b of the second wall portion 24 and the first wall portion 21 and is curved. Since the base end portion of the band-shaped portion 62 is sandwiched between the guide groove forming portion 26 and the linear portion 24a of the first wall portion 21, the movement of the band-shaped portion 62 is restricted and the head portion 61 can be fixed at a predetermined position.

(8) The harness fixing piece 16 has a support portion 27 extending from the bottom portion 25 toward the side opposite to the guide groove forming portion 26. The support portion 27 is located on the side of the first wall portion 21 with respect to the head portion 61 abutting on the second wall portion 24. Accordingly, when the head portion 61 tries to move toward the first wall portion 21, the head portion 61 abuts on the support portion 27, whereby the movement of the head portion 61 can be restricted.

(9) The support portion 27 includes a first support portion 27a extending from the bottom portion 25 and a second support portion 27b extending upward from the leading end of the first support portion 27a. The head portion 61 of the cable tie 60 has an insertion hole 61a through which the band-shaped portion 62 is inserted. The second support portion 27b is arranged so as not to overlap with the insertion hole 61a of the head portion 61 abutting on the second wall portion 24. Accordingly, by winding the band-shaped portion 62 of the cable tie 60 around the wire harness W and inserting the leading end portion 62a of the band-shaped portion 62 inside the second support portion 27b, the band-shaped portion 62 can be easily inserted into the insertion hole 61a of the head portion 61.

(10) As shown in FIG. 14, the head portion 61 of the cable tie 60 abuts on the first end portion 24c of the second wall portion 24 forming the guide groove 41 in the direction of the guide groove 41. Also, the head portion 61 abuts on the support portion 27 extending parallel to the guide groove 41 in the direction of the band-shaped portion 62 inserted through the head portion 61. Accordingly, it is possible to suppress positional variation of the head portion 61 of the cable tie 60 and rotational displacement along the band-shaped portion 62, and to prevent interference with other members.

(11) The electrical connection box 10 has a lower cover 14 included in the housing 11. The lower cover 14 has a cover main body 15 and a harness fixing piece 16. The wire harness W is fixed to the harness fixing piece 16 by the cable tie 60. The harness fixing piece 16 is attached to the base 12 of the housing 11 together with the cover body 15. Accordingly, by using the harness fixing piece 16, the wire harness W can be easily fixed to the housing 11, that is, to the electrical connection box 10.

MODIFIED EXAMPLES

This embodiment can be modified and implemented as follows. The present embodiment and the following modified examples can be implemented in combination with each other as long as there is no technical discrepancy.

The electrical connection box 10 of the above-described embodiment is an example of a harness component. The harness component need only have the wire harness W fixed thereto, and may be a connector halter, a protector, or the like.

At least one material in the base 12 included in the housing 11, the upper cover 13, the cover main body 15 included in the lower cover 14, and the harness fixing piece 16 may be, for example, a synthetic resin such as polyamide (PA).

The guide groove 41 of the embodiment is referred to in some cases as a positioning groove for positioning the band-shaped portion 62 of the cable tie 60 at a predetermined winding position in the vicinity of the insertion opening 17. The guide groove 41 can include an open slit configured such that the band-shaped portion 62 of the cable tie 60 can be inserted into the guide groove 41 from the lateral direction of the band-shaped portion 62 intersecting the length direction of the band-shaped portion 62. The groove inner surface of the guide groove 41 may be configured to oppose or come into sliding contact with the band-shaped portion 62 of the cable tie 60. The first end portion 24c of the second wall portion 24 of the embodiment is referred to in some cases as a head stopper surface that comes into direct contact with the head portion 61 of the cable tie 60.

The present disclosure includes the following aspects. Reference signs have been given to some of the constituent elements of the exemplary embodiments, not for limitation, but as an aid to understanding. Some of the items described in the following aspects may be omitted, and some of the items described in the aspects may be selected or extracted and combined.

[Supplementary Note 1] One aspect of the present disclosure is directed to a harness component (10) that is used together with a cable tie (60) including a long band-shaped portion (62) and a head portion (61) configured to engage with the band-shaped portion (62) at any length position, in which the harness component (10) can include:
an insertion opening (17) through which a wire harness (W) is pulled out; and
a positioning groove (41) for positioning the band-shaped portion (62) of the cable tie (60) at a predetermined winding position in the vicinity of the insertion opening (17), and
the positioning groove (41) may include an open slit, which is configured such that the band-shaped portion (62) of the cable tie (60) can be inserted into the positioning groove (41) via the open slit from a lateral direction of the band-shaped portion (62) intersecting the length direction of the band-shaped portion (62).

[Supplementary Note 2] In one aspect of the present disclosure, the positioning groove (41) may include:
a first groove inner surface (21c) configured to oppose or come into sliding contact with a first surface of the band-shaped portion (62) of the cable tie (60); and
a second groove inner surface (21c) configured to oppose or come into sliding contact with a second surface opposite to the first surface of the band-shaped portion (62) of the cable tie (60).

[Supplementary Note 3] In one aspect of the present disclosure, the harness component (10) can include:
a first wall portion (21) provided at or near the insertion opening (17), the first wall portion (21) including a first inner surface (21c) configured to come into contact with the outer peripheral surface of the wire harness (W) passing through the insertion opening (17) to support the wire harness (W), and a first outer surface (21b) on a side opposite to the first inner surface (21c); and
a second wall portion (24) provided at or near the insertion opening (17), the second wall portion (24) including a second inner surface opposing the first outer surface (21b) of the first wall portion (21) at a predetermined distance therefrom, and a second outer surface on a side opposite to the second inner surface,
in which the positioning groove (41) may be divided between the first outer surface (21b) of the first wall portion (21) and the second inner surface of the second wall portion (24).

[Supplementary Note 4] In one aspect of the present disclosure, the first outer surface (21b) of the first wall portion (21) may be the first groove inner surface (21c), and the second inner surface of the second wall portion (24) may be the second groove inner surface.

[Supplementary Note 5] In one aspect of the present disclosure, the harness component (10) may include
a head stopper surface (24c) that comes into direct contact with the head portion (61) of the cable tie (60) when the band-shaped portion (62) of the cable tie (60) is tightened in the positioning groove (41) along the positioning groove (41), and
the second wall portion (24) may be part of the head stopper surface (24c).

[Supplementary Note 6] In one aspect of the present disclosure, when the insertion opening (17) is viewed from the length direction of the wire harness (W), the positioning groove (41) may include a linear portion (24a) that extends in a tangential direction of the insertion opening (17), and a curved portion (24b) that is curved along the opening edge of the insertion opening (17).

[Supplementary Note 7] In one aspect of the present disclosure, the harness component (10) may be an electrical connection box for a vehicle.

LIST OF REFERENCE NUMERALS

10 Electrical connection box
11 Housing

12 Base
13 Upper cover
14 Lower cover
15 Cover main body
16 Harness fixing piece
17 Insertion opening
18 Cover piece
21 First wall portion
21a Lower end
21b Outer surface
21c Inner surface
22 Fixing portion
22a Rib
23 Fixing portion
23a Rib
24 Second wall portion
24a Linear portion
24b Curved portion
24c First end portion
24d Second end portion
25 Bottom portion
26 Guide groove forming portion
26a Side surface
27 Support portion
27a First support portion
27b Second support portion
41 Guide groove
41a First guide groove
41b Second guide groove
60 Cable tie
61 Head portion
61a Insertion hole
61b Locking piece
62 Band-shaped portion
62a Leading end portion
W Wire harness

What is claimed is:

1. A harness component comprising:
   a first wall portion that extends in a length direction of a wire harness arranged on an inner side of the first wall portion, wherein the wire harness is to be fixed to the harness component by a cable tie including a long band-shaped portion and a head portion that is formed in one piece with the band-shaped portion at a base end portion in a length direction of the band-shaped portion;
   a second wall portion that is arranged outside of an end portion of the first wall portion in the length direction of the wire harness, and is continuous along the end portion; and
   a bottom portion that extends outward from the end portion of the first wall portion and supports the second wall portion away from an outer surface of the first wall portion,
   wherein a guide groove through which the band-shaped portion of the cable tie is to be passed is formed between the first wall portion and the second wall portion,
   the first wall portion includes an inner surface and the outer surface, which face mutually opposite directions in a radial direction of the wire harness, and the inner surface and the outer surface are formed in a curved manner so as to bulge outward in the radial direction of the wire harness in a cross-sectional view intersecting the length direction of the wire harness,
   the second wall portion includes a linear portion that extends in a tangential direction with respect to the outer surface of the first wall portion, and a curved portion that is continuous with the linear portion and is curved along the outer surface of the first wall portion,
   a guide groove forming portion that has a side surface opposing the linear portion is included between the outer surface of the first wall portion and the linear portion of the second wall portion, and
   the guide groove includes a linear first guide groove that is sandwiched between the side surface of the guide groove forming portion and the linear portion of the second wall portion, and a second guide groove that is sandwiched between the curved portion of the second wall portion and the first wall portion and is curved.

2. The harness component according to claim 1,
   wherein the head portion of the cable tie abuts on a first end portion in a length direction of the second wall portion.

3. The harness component according to claim 2,
   wherein the head portion of the cable tie is movable in a direction opposite to the second wall portion from the first end portion of the second wall portion.

4. The harness component according to claim 1, further comprising
   a support portion that extends from the bottom portion to a side opposite to the guide groove forming portion.

5. The harness component according to claim 4,
   wherein the support portion includes a first support portion that extends from the bottom portion and a second support portion that extends upward from a leading end of the first support portion,
   the head portion of the cable tie includes an insertion hole through which the band-shaped portion is to be inserted, and
   the second support portion is arranged so as not to overlap with the insertion hole of the head portion abutting on the second wall portion.

\* \* \* \* \*